United States Patent [19]

Jung et al.

[11] 3,961,337

[45] June 1, 1976

[54] DISPOSABLE INK SUPPLY AND NOZZLE SYSTEM USING A SIMPLE PUMP

[75] Inventors: Werner Jung, Morton Grove; Kurt E. Knuth, Mount Prospect, both of Ill.

[73] Assignee: Teletype Corporation, Skokie, Ill.

[22] Filed: Aug. 26, 1974

[21] Appl. No.: 500,819

[52] U.S. Cl. .......... 346/140 R; 346/75

[51] Int. Cl.[2] .......... G01D 15/18

[58] Field of Search .......... 346/140, 75; 239/590.3

[56] References Cited

UNITED STATES PATENTS

| | | | |
|---|---|---|---|
| 1,635,977 | 7/1927 | Ranger | 346/140 X |
| 1,941,001 | 12/1933 | Hansell | 346/75 |
| 3,169,821 | 2/1965 | Miller | 346/140 |
| 3,185,998 | 5/1965 | Bussey et al. | 346/140 |
| 3,247,519 | 4/1966 | Sihvonen | 346/140 |
| 3,296,624 | 1/1967 | Ascoli | 346/140 |
| 3,335,424 | 8/1967 | Hartai | 346/140 |
| 3,441,950 | 4/1969 | Miller | 346/140 |
| 3,641,588 | 2/1972 | Metz | 346/75 |
| 3,708,118 | 1/1973 | Keur | 346/75 X |
| 3,761,953 | 9/1973 | Helgeson | 346/75 |
| 3,831,727 | 8/1974 | Kruspe et al. | 346/140 X |

FOREIGN PATENTS OR APPLICATIONS

| | | | |
|---|---|---|---|
| 494,457 | 3/1930 | Germany | 346/140 |

OTHER PUBLICATIONS

Videojet M9600 Printer Technical Description, A. B. Dick Company, Chicago, Ill., 1971, 12 pages.

*Primary Examiner*—Joseph W. Hartary

*Attorney, Agent, or Firm*—W. G. Dosse; W. K. Serp; J. L. Landis

[57] ABSTRACT

An ink supply system for an ink jet recorder wherein ink is emitted by a nozzle and impinges on a sheet of paper. An open-cell-foam-filled container supplies ink to a tube-shaped pump chamber which holds at least enough ink to print one page of copy. The tube is squeezed in such a manner as to deliver ink at a substantially constant pressure to the nozzle, which forms the jet. Ink emitted by the nozzle but not impinging on the paper is returned to the container. A check valve prevents ink from returning from the tube-shaped pump chamber to the foam-filled container except via the nozzle. Release of the squeezed tube draws ink from the foam-filled container into the tube-shaped pump chamber.

1 Claim, 8 Drawing Figures

MOTOR
CLUTCH
CAM
TIMER
PAGE FEED
SET
80
81
82
83
60
56
51
52
30
61
62

DISPOSABLE INK SUPPLY AND NOZZLE SYSTEM USING A SIMPLE PUMP

FIELD OF THE INVENTION

The present invention relates to ink jet recorders and more particularly to a disposable ink supply, pump, and nozzle system therefor.

BACKGROUND OF THE INVENTION

This application relates generally to an improved system for supplying metered quantities of printing ink to an ink-jet printer of the "squirting jet" type, and particularly to a simple and inexpensive system for supplying a sufficient quantity of ink under constant pressure to print one page at a time, using a disposable ink supply system.

In squirting jet printers, for example, as described in R. W. Nordin U.S. Pat. No. 3,500,436, granted on Mar. 10, 1970, herein incorporated by reference, printing ink is supplied to a nozzle under pressure to squirt out a succession of drops, which are then electrostatically controlled in any of various known ways to print characters on a paper or other recording medium.

A specific object of this invention is to provide a simple and inexpensive system of supplying metered quantities of ink under substantially constant pressure to such printers, particularly such a supply using an ink system with disposable parts to minimize contamination of the ink and exposure of operators or repair personnel to such ink.

A further object is to provide such a supply system, wherein an immediate ink supply reservoir can supply enough ink to print one complete page or sheet of copy, and can be quickly refilled when a new page is inserted.

SUMMARY OF THE INVENTION

With these and other objects in view, an ink-supply system in accordance with certain principles of the invention includes filling a closed, compressible reservoir with at least enough ink to print one page of copy. The reservoir is connected to a nozzle of the printer and is so filled prior to the time that a fresh page is positioned in the printer. Then, the reservoir is squeezed with a continuously applied force sufficient to supply the ink at essentially constant pressure to the nozzle to form a stream of drops of sufficient duration to print an entire page. After the page has been printed, the reservoir may contain a small residual amount of ink but essentially not enough to print another page. At the end of the page and while a new page is being inserted into the printer, the reservoir is refilled from a primary supply.

Preferably, the primary supply is a disposable plastic container with sufficient ink to print a great many pages, and the single-page reservoir is refilled from the plastic container by suction. When the larger container is nearly exhausted of ink, the entire supply system consisting of at least the container, the reservoir, and the nozzle can be thrown away and a fresh supply system inserted in the printer.

Other objects, advantages, and features of the invention will be apparent from the following detailed description of a specific embodiment of the invention, when read in conjunction with the accompanying drawings wherein like reference numbers indicate the same or similar parts throughout the several illustrations.

DETAILED DESCRIPTION

General Principles and Background on the Printing Process

Figure 1:
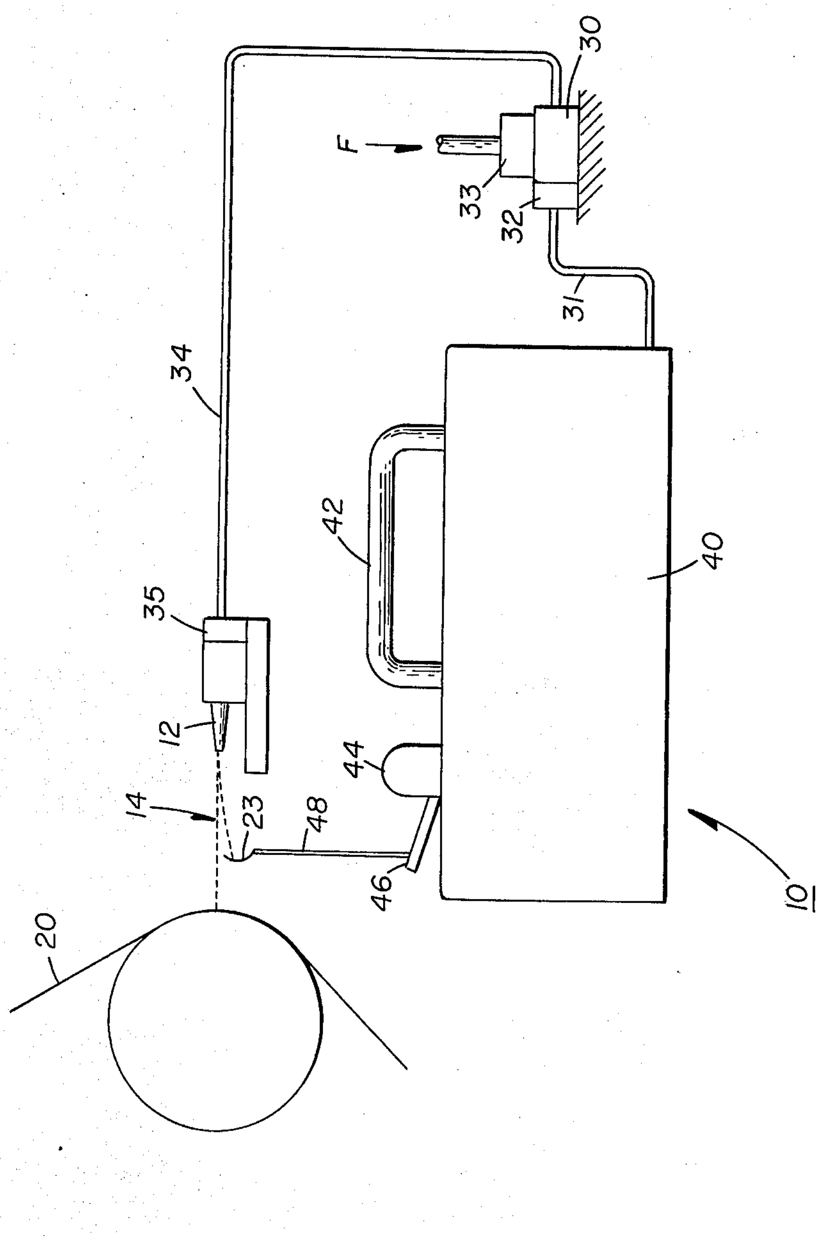
FIG. 1 is a partially schematic illustration of an ink supply system in accordance with the principles of the invention.
Figure 2:
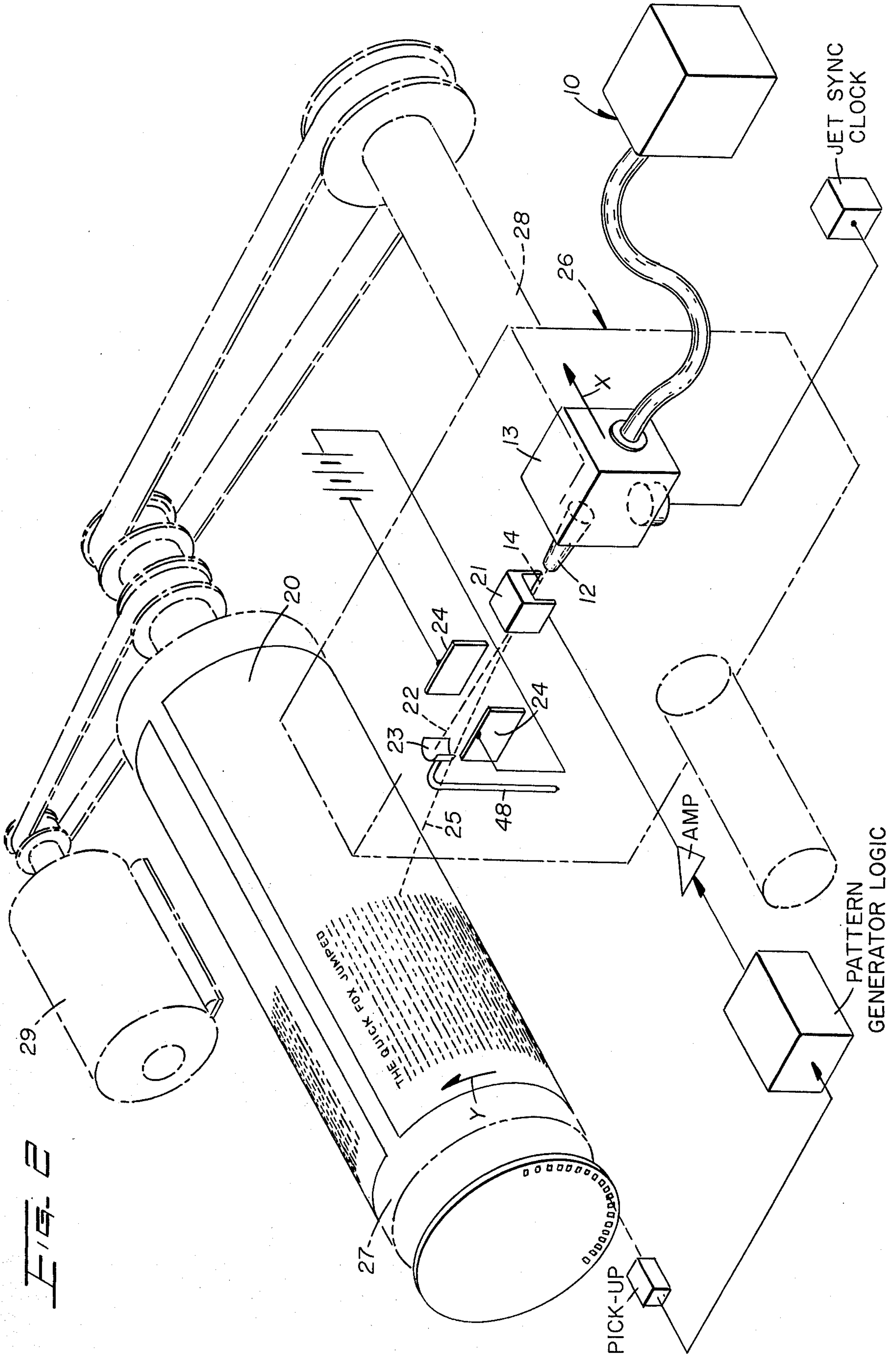
FIG. 2 is a partially schematic perspective illustration of an ink jet printer with which the ink supply system of FIG. 1 might be used.

Referring first to the generally schematic layout in FIG. 1, this invention relates to a system and mechanism for supplying a predetermined quantity of ink under substantially constant pressure to a nozzle 12 of an ink-jet printer of any known type. One example of such a printer is described in the abovementioned Nordin U.S. Pat. No. 3,500,436; and another such printer is illustrated in FIG. 2 hereof. Preferably, the ink is supplied to the nozzle at a substantially constant pressure, for example 160 psi. In one typical example, ink is supplied through a filter contained within the nozzle mechanism. Such a nozzle preferably has an orifice of approximately 0.0008 inch diameter.

The nozzle 12 forms the pressurized ink into a steady stream 14 of small droplets, as is well known in the art. This type of printer is referred to as a "squirting jet" printer since the ink is continuously squirted under pressure from the nozzle so as to form the steady stream 14 of extremely small droplets. As is also well known, the nozzle or the ink upstream of the nozzle may be vibrated or pulsed in various ways to form a regular stream of droplets synchronized with the vibrations or pulses. This type of printer is known as a "synchronous jet" printer, and one example of this technique is described in the Nordin patent. The ink drops of the stream 14, or preferably only some of them, are electrostatically charged in a known manner, and selected ones of the drops are then directed to a page of paper 20 or other recording medium for printing.

In a preferred example illustrated in FIG. 2, all drops of the stream 14 pass a selective charging electrode 21, and each drop in the stream 14 is either charged or not charged at that point, in response to data inputs, depending on whether or not the particular drop is required in printing a particular character or pattern on the paper 20. In this arrangement, the uncharged drops proceed along a straight line path 22 and are intercepted by a catcher 23 for these unwanted drops and cannot reach the paper to print. However, the charged drops are deflected electrostatically, as by fixed potential electrodes 24—24, past the catcher 23 along a printing line 25 so that the selected drops intercept and thus print on the paper 20 as disclosed in the application for U.S. Pat. filed Dec. 12, 1973, Ser. No. 424,024, now abandoned, in the name of James M. Berry.

Preferably, the stream 25 of printing drops is scanned horizontally across the paper 20, arrow X, and the paper is moved vertically upward in synchronism, arrow Y, so that the printing drops scan the paper in a raster of parallel scan lines to print characters, patterns, or other desired information on the paper. Either the printing drops from one or more nozzles 12 may be scanned across the page by electrostatic deflection, as in the Nordin patent, or preferably one or more nozzles 12 may be mounted on a reciprocable carriage 26 to travel across the page in timed relation to the paper movement, as shown in FIG. 2. In the embodiment illustrated in FIG. 2, the paper 20 is wrapped to form a cylinder on a recording drum or platen 27; and a single nozzle 12, charging electrode 21, deflection electrodes 24—24, and catcher 23 (together forming the print head) are all mounted on the reciprocable carriage 26 for traversing movement across the paper 20 on the platen 27. The carriage 26 is threadedly received in a conventional lead screw 28, and is driven in synchronized relation to the platen 27 by a drive motor 29.

Many different arrangements for squirting jet printing are known, and form no part of this invention, the main common feature of interest being that it is required to supply a steady stream 14 of drops from one or more nozzles 12 under substantially constant pressure sufficient to print an entire page of the paper 20, without interrupting the stream of drops. The amount of ink needed is essentially the same for a given size of page, regardless of the area of paper used for any particular message (that is, the number of drops actually selected for printing) since the same number of drops must be propelled from the nozzle in any case, those not used in printing being merely routed to the catcher 23. Thus a solid black page (all drops print) and a solid white page (no drops print) consume exactly the same amount of ink in the process.

In a typical example, using an ordinary waterbased, permanent-black fountain pen ink, a 0.0008 inch diameter nozzle, and a standard 8½ × 11-inch page, approximately one cubic centimeter of ink is required to print the page. After printing, each page 20 is removed from the platen 27, or otherwise the individual "pages" may be connected in a long sheet using perforations between pages so as to permit detachment of each separate page some time either before or after printing, considering the restraints imposed by the platen 27.

Ink-Supply System

Referring again to FIG. 1, an ink-supply system 10 for such a printer includes a closed, compressible reservoir 30 preferably of tubular shape and sufficiently large to hold at least enough ink to print just one complete page; for example two cubic centimeters in the specific example previously described where only one cc is needed for printing each page. The reservoir 30 is arranged to supply all the ink needed for one page during each cycle of printing one page, and to be refilled with a fresh supply of ink after each page has been printed.

In the partially schematic view of FIG. 1, the reservoir 30 is initially filled from a supply line 31 through a one-way check valve 32 to a first volume $V_1$ (2 cc in the example), as will be explained. At the start of the printing cycle, when a fresh page 20 is inserted in the printer, a plunger 33 is forced downward against the compressible reservoir 30 to force the ink through an ink-supply line 24, an integral filter (not shown) at the nozzle 12, and out through the small orifice of the nozzle 12. The force F applied to the piston 33 should be sufficient to impose a substantially constant pressure on the ink and thus expel the stream 14 at a substantially constant velocity, which normally requires that the force F applied to the plunger 33 be a gradually increasing force, depending on the type of compressible reservoir 30 that is used. Further examples of this will be explained hereafter.

When each page 20 has been printed, the reservoir has thus been compressed substantially, to about one-half its original volume in the example illustrated, to a second volume $V_2$ (about 1 cc in the example). At this time, the movement of the plunger 33 is reversed by any conventional mechanism and returned to its initial position, thereby allowing the natural resiliency of the reservoir 30 to cause the reservoir 30 to revert to its original shape and volume $V_1$. When this occurs, the ink stream stops. The resiliency of the reservoir is not sufficient to cause retrograde flow of ink from the nozzle 12 to the reservoir 30 because of the microscopic diameter of the nozzle orifice. However, if such flow should occur, it can readily be blocked by a check valve 35 placed in the supply line 34 between the reservoir 30 and the nozzle 12.

Withdrawal of the plunger 33 allows the resiliency of the material of the reservoir 30 to form a partial vacuum in the reservoir 30, which sucks ink into the reservoir 30 through the supply line 31 and the check valve 32 to refill the reservoir 30. Of course, the check valve 32 prevents any flow of ink from the reservoir 30 through the supply line 31 on the power stroke, when ink is being forced through the nozzle 12.

The supply line 31 is connected to a large ink supply 40, in this example consisting of a rectangular plastic box filled with an open-cell foam 41 holding a large supply of the ink. The quantity of ink in the supply 40 is large compared to the volume of the reservoir 30. In a typical example, the supply 40 holds approximately one quart of ink, which is about 500 times the capacity of the reservoir 30, and about 1000 times the amount needed to print a page of copy. Thus, the supply must be replaced after printing a minimum of a thousand pages of copy. The size of the supply 40 is not important to the principles. It should merely be as large as is convenient to handle so that it need not be replaced too often.

The supply 40 is a throw-away unit, made of a thin plastic, such as polyethylene, so that it can retain its shape as ink is withdrawn therefrom by the resilient action of the reservoir 30. Of course, the outlet end of the supply 40 is connected with a seal to the inlet end of the supply line 31 to the reservoir 30.

The ink supply 40 is preferably equipped with a handle 42 with which it can readily be transported and inserted into an appropriate place in the printer.

The ink supply 40 is preferably equipped with an ink return facility comprising a valve 44 and a lip 46. During storage, transport, and installation of the inkfilled supply, the valve 44 is closed to prevent ink from spilling. Once the supply 40 is safely positioned within the cabinet of a printer, the valve 44 is opened. This allows air to enter the supply 40 to replace ink as it is drawn through the line 31. Opening the valve 44 also allows waste ink from the catcher 23 to flow down a trough 48 and into the lip 46. The ink then flows from the lip 46, through the valve 44, and back into the supply 40.

The supply 40 could, alternatively, be a flexible plastic bag made of a material such as polyethylene. The ink would again be drawn from the plastic bag supply by the reservoir 30 and forced out the nozzle 12. Waste ink striking the catcher 23 would then be discarded as a liquid, or it could be dried and discarded as a solid.

Tests have shown that in a typical squirting ink jet printer the vast majority of the ink issuing from the nozzle never strikes the paper, but is waste. To recover the waste ink is attractive, but it has also been found that waste ink contains considerable lint, dust, and other nozzle-clogging contaminants. These contaminants come from many sources. The paper 20 is a common source of lint in any printer. The electrostatic voltages on the deflection electrodes 24 and the charging electrode 21 also attract lint and dust. The charged ink flowing from the nozzle 12 to the catcher 23 is a natural liquid scrubber to attract and hold charged or uncharged lint and dust. Therefore, to seal the ink supply system and use a collapsible bag supply 40 is an attractive alternative.

However, if waste is returned to the supply 40, the number of sheets of copy that can be printed from one supply 40 increases typically by one or two orders of magnitude. Therefore, the open-cell foam inside the right supply 40 not only serves as a baffle to limit splashing, but also serves to filter recycled ink as it passes from the valve 44 to the supply line 31. The filter at the nozzle 12 also serves to keep lint, dust, and contaminants from clogging the nozzle orifice. Therefore, with adequate filtration, recycling becomes feasible.

Preferred Embodiment of Supply System

Referring now to FIGS. 3–6, there is shown a preferred reservoir and pump system, further details and refinements of which are described in a related, commonlyassigned, copending application of Werner Jung, Ser. No. 500,800 filed on Aug. 26, 1974.

In this embodiment, the reservoir 30 consists of a cylindrical tube (also designated by the reference number 30) of a thin-walled compressible plastic, such as "Tygon", positioned between two congruently curved dies or jaws 51 and 52 as shown. In one example, for a nominally two cc reservoir, the tube 30 is 1.25 inches long, 0.375 inch I.D. and 0.500 inch O.D. This tubing is virtually totally compressible from the circular configuration in FIGS. 3, 4, and 5, to the totally compressed configuration in FIG. 6. When the pressure of the jaws 51–52 is released, the tube 30 quickly springs back to its initial configuration.

In practice, the lower jaw or anvil 52 is mounted for movement between either of two positions. The upper jaw or ram 51 is movably mounted with respect to the anvil 52 so that the jaws 51 and 52 can be moved separately or together.

Figures 4, 5, 7:
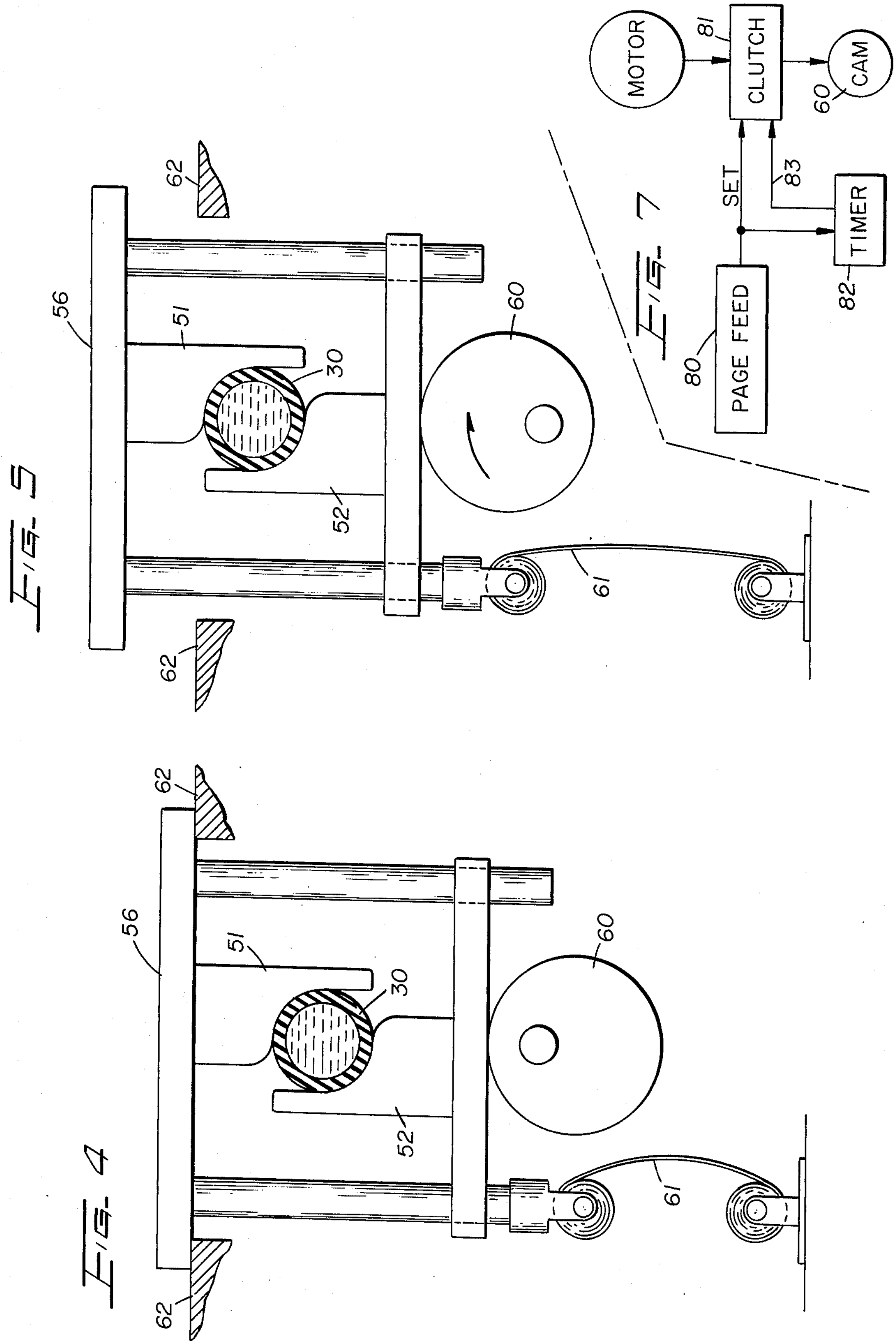
FIGS. 4 and 5 are illustrations of an exemplary squeezing pump in two operative positions.
FIG. 7, on the same sheet as FIG. 3, is a simplified, schematic diagram of a control system for the pump of FIGS. 3–6.

The initial position of the jaws is shown in FIG. 4, where the tube 30 has just been filled from the supply 40 and a printing operation is about to begin. At this time a cam 60 is turned through a preset angle to raise the lower die or jaw 52 from the FIG. 4 position to the FIG. 5 position. During this time, the upper jaw 51 is also raised as the upward force exerted by the lower jaw 52 is transmitted through the filled tube 30 to the upper jaw 51. At this point, the cam 60 stops, and thereafter serves as a fixed support or backstop for the compression operation. In the FIG. 5 position, a substantially constant force spring 61 pulls downward on a bridge 56 to force the upper jaw 51 downward towards the now fixed lower jaw 52 and thus squeeze the tube 30 therebeteween to expel the ink from the tube to the nozzle 12. As explained in detail in the abovementioned Jung application, the spring force is constant throughout the squeezing process.

The timing is regulated such that printing of a page begins shortly after the jaws 51–52 are raised to the FIG. 5 position, and the spring 61 starts compressing the tube. Ink expelled at a non-constant rate during start up is caught in the catcher 23.

Figure 6:
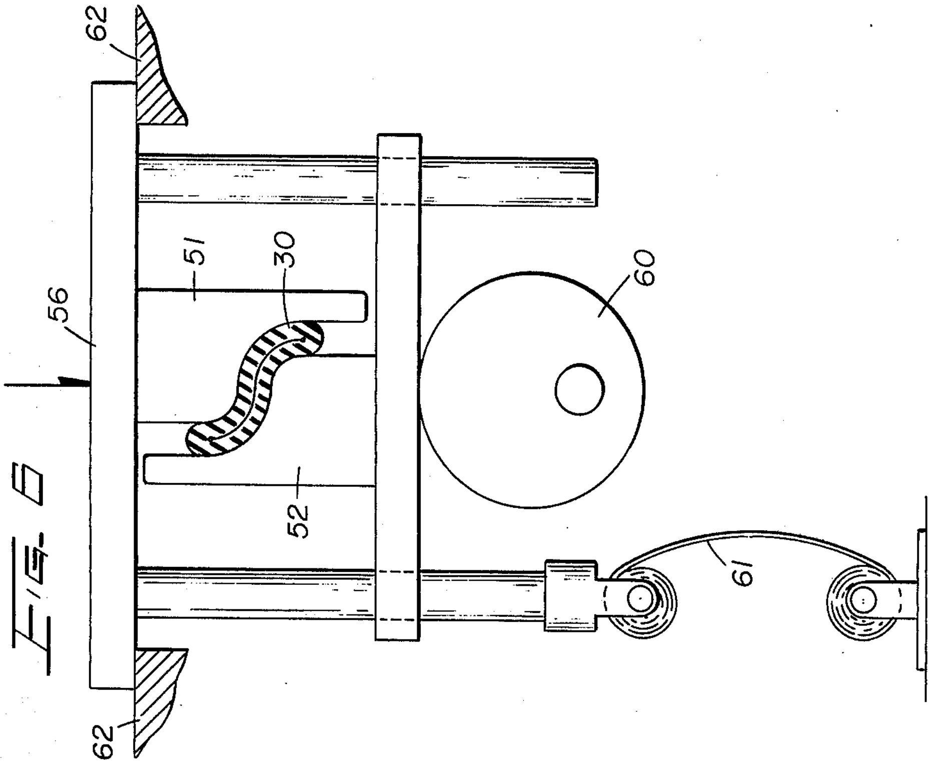
FIG. 6 on the same sheet as FIG. 3, is an illustration of a nearly emptied reservoir within the pump jaws.

When a page has been printed, as previously described, the tube has been squeezed to a compressed position as shown in FIG. 6, the cam 60 is returned to its lowest position, which returns the lower jaw 52 to the FIG. 4 position, which retracts the upper jaw or ram 51 against the force of the spring 61 and thus permits the tube 30 to spring back to its initial position and thereby refill with ink from the supply 40. During this time, the bridge 56 hits a fixed stop 62, so that the spring 61 cannot continue to compress the tube 30 or oppose its reopening to refill.

Figure 3:
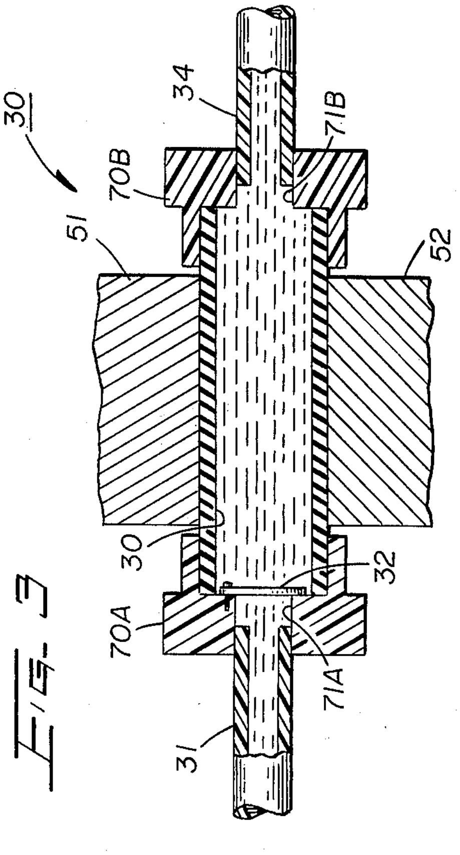
FIG. 3 is a cross-sectional illustration of the ink reservoir between pump jaws.

FIG. 3 illustrates the tube 30 in longitudinal cross-section. It is fitted with a plug 70 at each end, having a control passage 71 for ink flow in and out, each passage being connected by a standard fitting (not shown) to the outlet line 34 and the inlet line 31, respectively, at opposite ends. The check valve 32 shown schematically in FIG. 1 is shown as a flap valve in FIG. 3.

Control System

FIG. 7 is a diagram of a simplified control system, wherein a paper or page feed mechanism 80 sends a signal to an electromagnetic clutch 81 connected between the cam drive motor and the cam 60, which immediately turns the cam, for example 180°, to the high position of FIG. 5 so as to begin the flow of ink to the nozzle 12. After a preset time delay by a timer 82 connected between the page feed signal source 80 and the clutch 81, a second input 83 to the clutch 81 signals the clutch to rotate another 180° to the low position shown in FIG. 4 so as to open the tube 30 to refill it. In practice, the timer is adjusted to provide a long enough interval (for example 75 seconds) to assure that a full page of ink has been delivered. A more complete description of a constant-pressure pump may be had from the abovementioned Jung application.

Alternate Ink Pump

Figure 8:
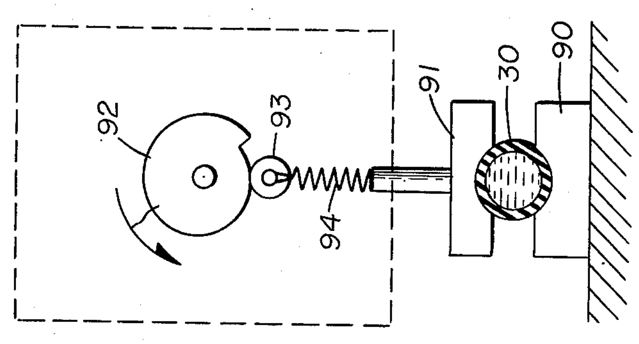
FIG. 8, on the same sheet as FIG. 1, is an alternate means for obtaining the squeezing pump force of FIG. 1.

Referring now to FIG. 8, as an alternative to the pump of FIGS. 3–6, inclusive, the tube 30 can be positioned between a fixed anvil 90 and a movable ram 91. A cam 92 is turned by a single-revolution clutch driven by a motor (not shown). The single-revolution clutch is controlled by the same "set" signal issued by the page feed 80 of FIG. 7.

As the cam 92 rotates from its initial position, it moves the follower 93 so as to compress the spring 94. Compression of the spring 94 applies a force to the ram 91 in proportion to the amount that the spring 94 has been compressed. The force on the ram 91 causes the ram 91 to squeeze the tube 30 against the anvil 92 and thus send ink to the nozzle 12. The tube 30 tends to flatten as it empties through the nozzle 12. The flatening increases the area of contact of the tube 30 and the ram 91. Just as in the case of a soft automobile tire, increased areas of contact will permit reduced pressure inside the tube 30 to oppose the same ram force.

Therefore, the force on the ram 91 must be increased as the tube 30 flattens. The increase in force needed can readily be determined by a simple series of static tests as ink is permitted to pass through the line 34. The force necessary can be related to a degree of compression of the spring 94, which relates directly to the profile of the cam 92, as thoroughly understood by anyone skilled in simple machine design.

By the time a page has been printed, the cam 92 has turned through almost one revolution and permits the follower 93 quickly to ascend and remove all force on the tube 30. The tube 30 is then free to resume its original shape and draw ink from the supply 40.

Summary

From the foregoing description, it should be apparent that this process and equipment provides a simple and inexpensive way to provide uniform charges of printing ink at constant pressure to a squirting jet printer, with one predetermined quantity or charge being provided for each page to be printed. The ink can then be supplied in a totally or partially sealed system for a great number of pages, such as 1000 or more; and when the supply 40 is spent, the entire assembly of supply base 40, reservoir tube 30, supply lines 31 and 34, and check valves 32 and 35 can be thrown away, and even the nozzle 12 if desired.

The ink supply system is composed of simple inexpensive parts, fittings and valves, and a sealed throw-away system is highly desirable as it preserves the quality of the ink against possible exposure to the atmosphere, if desired, and obviate the need for operators and repair of set-up personnel to be exposed to the ink.

While specific embodiments and examples of the invention have been described in detail above, it will be obvious that various modifications may be made from the specific details described without departing from the spirit and scope of the invention.

What is claimed is:

1. In combination with an inkjet printer of the type having a nozzle from which ink is forced in a stream of drops, which are manipulated electrostatically to print information patterns on a sheet of paper placed in the printer, and wherein relative movement is caused between the nozzle and the paper to print a page of copy, after which the page is removed and a fresh sheet of paper is inserted in the printer, an improved apparatus for forming a constant pressure ink jet of sufficient duration to print a full page, which comprises:

a thin-walled cylindrical tube with closed ends, the tube being made of a compressible resilient plastic;

an ink supply line connecting the tube to the nozzle;

a pair of dies between which the tube is mounted with the dies engaging opposed portions of the cylindrical wall of the tube;

means for moving the dies to an open position, in which no force is exerted on the tube;

means responsive to opening of the dies for filling the tube with ink;

means responsive to a paper-feed signal to the printer for gradually closing the dies so as to compress the tube and force ink through the nozzle in a stream of droplets having a sufficient constant velocity for ink jet printing, the means for closing being arranged to close the dies with a gradually increasing force required to squirt the ink through the nozzle at a substantially constant pressure for a time long enough to print one page of copy after start up, the means for closing the dies being timed to start the ink stream prior to the time that a fresh page has been inserted and printing is to begin so that the effect of an initial shock wave when the dies start to close is dissipated prior to printing and a steady-state, constant-velocity ink jet is established prior to the start of printing each new page;

means responsive to the completion of each page of printing for operating the means for opening the dies, the walls of the plastic tube springing back to their cylindrical configuration when the dies are opened and creating a partial vacuum in the tube, which vacuum is effective to suck ink into the tube from the means for filling;

a refill line connecting the tube with the means for filling; and a one-way check valve in the refill line for allowing ink to pass only from the supply means to the tube, and preventing any flow through the refill line when the dies are closed.

* * * * *